United States Patent [19]

Van Grinsven et al.

[11] 3,867,470

[45] Feb. 18, 1975

[54] HYDROCARBON SEPARATION PROCESS

[75] Inventors: Petrus F. A. Van Grinsven; Wim Wieldraaijer; Rudolf J. Maas, all of Amsterdam, Netherlands

[73] Assignee: Shell Oil Company, Houston, Tex.

[22] Filed: Dec. 10, 1973

[21] Appl. No.: 423,031

[30]     Foreign Application Priority Data
   Dec. 13, 1972  Great Britain .................... 57471/72

[52] U.S. Cl. ........................... 260/674 SA, 208/310
[51] Int. Cl. .............................................. C07c 7/12
[58] Field of Search ................ 260/674 SA; 208/310

[56]              References Cited
              UNITED STATES PATENTS
3,626,020   12/1971   Neuzil ............................... 260/674

Primary Examiner—Delbert E. Gantz
Assistant Examiner—C. E. Spresser

[57]            ABSTRACT

Ethylbenzene is separated from a mixture of $C_8$-aromatics through preferential adsorption of ethylbenzene by contacting the mixture with a faujasite having from 64 to 96 aluminum atoms per unit cell, A, and containing a fraction of cesium cation equivalents over total cation equivalents present in the faujasite which is from 0.0119A minus 0.5 to the least of 0.15 or 0.0119A minus 0.7, the remainder of the cations being selected from strontium, calcium and sodium, then desorbing the adsorbed $C_8$-aromatics.

9 Claims, No Drawings

HYDROCARBON SEPARATION PROCESS

BACKGROUND OF THE INVENTION

The invention relates to a process for the separation of ethylbenzene from a mixture of $C_8$-aromatics.

Mixtures containing substantial quantities of $C_8$-aromatics (the term $C_8$-aromatics standing for the three isomeric xylenes and ethylbenzene) are produced on a technical scale in the petroleum industry by reforming and isomerization processes.

It is of importance to have available a convenient method for the separation of the $C_8$-aromatics into their components, since these are valuable feedstocks in the chemical industry. In particular para-xylene is a valuable base material for the production of terephthalic acid which is used for the preparation of synthetic fibres.

Separation of a mixture of $C_8$-aromatics into its components by distillation is difficult since their boiling points are very near to each other, while separation by crystallization is tedious and costly.

A known method to separate $C_8$-aromatics into their components is selective adsorption of one of these components on a faujasite which is loaded with one or a mixture of cations. Up till now no faujasites loaded with cations have been known which have such a selectivity for the adsorption of ethylbenzene as compared with the other $C_8$-aromatics, in particular para-xylene, that a technical separation process can be based thereon.

THE INVENTION

Selectivity in this specification is defined for two given components as the ratio of the amounts of the two components which are adsorbed onto the faujasite over the ratio of the amounts of the same compounds in the unadsorbed phase under equilibrium conditions. If the two components are represented by P and Q the selectivity can be expressed in equation form by:

Selectivity = [% weight P/ % weight Q] adsorbed/[% weight P/ % weight Q] unadsorbed It has now been found attractive high selectivities towards ethylbenzene in relation to the other $C_8$-aromatics can be attained by contacting a mixture which contains $C_8$-aromatics with a faujasite wherein the number of aluminum atoms in the unit cell lies between certain limits, and wherein cesium cations and strontium and/or calcium and/or sodium cations are present in amounts that are related to the number of aluminum atoms in the unit cell.

Accordingly, the invention provides a process for the separation of ethylbenzene from a mixture of $C_8$-aromatics which comprises preferential adsorption of ethylbenzene by contacting the mixture with a faujasite in which the number of aluminum atoms per unit cell (A) ranges from 64 to 96 (inclusive), and in which faujasite the fraction of equivalents of cesium cations present calculated on total equivalents of cations present in the faujasite is from 0.0119A minus 0.5 to the least of 0.15 or 0.0119A minus 0.7, the remainder of the cations present in the faujasite being strontium cations and/or calcium cations and/or sodium cations, followed by desorption of the adsorbed $C_8$-aromatics.

The faujasites are a well known form of natural or synthetic aluminosilicates. They have a unit cell, which is the smallest recurring unit in their crystal structure, which contains a total of 192 silicium plus aluminum atoms. Hence the ratio of the number of silicium atoms to aluminum atoms can easily be calculated from A. The number of cationic equivalents which can be loaded onto the faujasite is substantially equal to the number of aluminum atoms, and hence the total number of cations which can be loaded onto the faujasite can be calculated; it depends on the valency of the cations involved since a balance of charges must be maintained.

Preferably the mixture of $C_8$-aromatics comprises para-xylene.

It is preferred that A ranges from 74 to 96 (inclusive), and, e.g., is about 86. Faujasite X, which is commercially available, and has an A of about 86, is very suitable.

Faujasites which, besides with cesium, are loaded with mixtures of two or three of the cations of strontium, calcium and sodium, can very suitably be used. However, for practical reasons it is in general preferred to use faujasites loaded with strontium cations or calcium cations or sodium cations. The best results are obtained with faujasites wherein besides cesium cations substantially only calcium cations or only sodium cations are present, and these faujasites are preferred. In a faujasite loaded with cesium and calcium cations small amounts of sodium cations may be present, which stem from the sodium cations present in the faujasite which served as the starting material for the preparation of the said faujasite according to the invention. In this specification the term "to be loaded with" is equivalent to "to be present in".

The faujasites may be loaded with the desired cations in any convenient way. In case synthetic faujasites are used the desired cations may be present in the required amounts during the preparation of the faujasite. If a natural or synthetic faujasite is used wherein the cations present consist totally or substantially of other cations than the desired ones, in general of sodium cations, these cations may very conveniently be replaced by the desired cations by means of ion exchange with neutral or basic salt solutions. It is also possible to replace all or substantially all of the undesired cations by cesium cations or the desired strontium and/or calcium and/or sodium cations and subsequently replace part of these cations by the desired amount of strontium cations and/or calcium cations and/or sodium cations or cesium cations, respectively. It is also possible to replace the undesired cations with a mixture of cesium cations and the desired other cation or cations. In general the amount of cations originally present, in particular sodium ions, present in these faujasites according to the invention which contain cesium cations and strontium cations and/or calcium cations is very small, e.g., below 0.1 percent w on total faujasite.

After the loading of the faujasites with the desired cations in the desired amounts water still present is to be removed, which can easily be accomplished by heating, e.g., to a temperature of 200° to 800°C.

The faujasites according to the invention can be used for the separation of ethylbenzene from a mixture of $C_8$-aromatics in any desired form, e.g., in powder form. In technical installations pellets or extrudates of the faujasites, e.g., with a diameter of about 0.15–0.30 cm, can very suitably be used. If desired the faujasites may contain an inert binder material, e.g., a clay.

The mixture of $C_8$-aromatics can be contacted with the faujasite according to the invention in the vapor phase (e.g., at temperatures up to 400°C) or in the liquid phase, the latter being preferred in technical operations. In general in the liquid phase contacting temperatures from 0°–300°C are very suitable.

The pressure may vary between wide limits and, e.g., range from 0.001 bar to 100 bar. In general pressures of approximately 1 bar are very suitable if the contacting is carried out in the liquid phase.

If it is desired to work at room temperature in the vapor phase, only very low pressures can be applied. It is attractive to determine selectivities at room temperature or any other desired temperature in the vapor phase, since in that case no problems arise with the removal of non-adsorbed xylenes which in the liquid phase are attached to the surface of the faujasite and/or trapped in the intercrystalline voids. Selectivities are dependent on temperature, but independent of the phase (liquid or vapor) of the mixture of $C_8$-aromatics.

If desired the mixture of $C_8$-aromatics to be separated may contain an inert solvent when contacted with the faujasite. Aliphatic hydrocarbons, such as isooctane (2,2,4-trimethylpentane) are very suitable for this purpose. As a matter of course any inert solvent used must be easily separable from $C_8$-aromatics by distillation.

The contact between the $C_8$-aromatics and the faujasite according to the invention may be accomplished in batch or in a column filled with the faujasite. In the latter case the flow of the mixture of $C_8$-aromatics may be upwards or downwards. At the desired moment, e.g., when no more ethylbenzene is preferentially adsorbed, and the effluent has substantially the same composition as the feed, the adsorbed mixture is to be desorbed from the faujasite which can be accomplished with the aid of desorbents such as benzene, toluene, para-diethylbenzene, higher aromatics, ethers, alcohols, cyclic dienes and ketones, all of which should have boiling points different from that of $C_8$-aromatics. The desorbed mixture is enriched in ethylbenzene compared with the original mixture of $C_8$-aromatics. Further separation of ethylbenzene from the mixture of $C_8$-aromatics obtained in this way can be achieved by repeating the process according to the invention, until ethylbenzene with the desired degree of purity is obtained.

In a very convenient way the ethylbenzene separation from a mixture of $C_8$-aromatics according to the invention resulting in ethylbenzene of high purity is carried out with a simulated moving bed of the faujasite, e.g., as described by D. P. Thornton in Hydrocarbon Processing of November, 1970, pp. 151–155.

In the example the selectivity of ethylbenzene to para-xylene was determined; ortho-xylene and meta-xylene behave in a way similar to para-xylene.

EXAMPLE

The selectivities of several faujasites loaded with cesium cations and calcium cations, and/or strontium cations, and/or sodium cations for 50/50 mixtures of para-xylene and ethylbenzene were determined in the following manner.

In a vertical reactor with a volume of 26 ml, which was filled with the faujasite to be investigated, at 25°C and a pressure of 7 mm Hg the 50/50 mixture of para-xylene and ethylbenzene in the vapor phase was led through the faujasite, until the composition of the feed was equal to that of the effluent. Subsequently, the adsorbed $C_8$-aromatics were removed from the faujasite by stripping with nitrogen at 200°C for 2 hours and at 500°C for another 2 hours. The effluent gas stream was cooled in a cold trap to −80°C in order to condense the desorbed $C_8$-aromatics (the desorbate). From the compositions of the feed and the desorbate the selectivity for ethylbenzene over para-xylene was calculated. The analysis of feed and desorbate was carried out with the aid of gas chromatography.

The table shows the results. Experiments 1–4, 7 and 9 are according to the invention. Experiments 5, 6, 8, 10 and 11 are for comparison only. In experiment 5 of the fraction of cesium cation equivalents is higher than 0.0119 × 86−0.5, in experiment 6 A is lower than 64, in experiment 8 the fraction of cesium cation equivalents is lower than 0.15 (and of course lower than 0.0119 × 86−0.7), and in experiments 10 and 11 cesium is replaced by potassium. In all the comparative experiments the selectivities obtained were lower than those obtained with the faujasites according to the invention.

TABLE[1]

| Exp. | A | cation other than Cs | fraction of Cs cation equivalents / total cation equivalents | selectivity ethylbenzene /para-xylene |
|---|---|---|---|---|
| 1 | 86 | Na | 24 | 1.84 |
| 2 | 86 | Na | 35 | 2.33 |
| 3 | 86 | Na | 39 | 2.17 |
| 4 | 86 | Na | 48 | 1.65 |
| 5 | 86 | Na | 62 | 1.23 |
| 6 | 56 | Na | 52 | 1.54 |
| 7 | 86 | Ca | 41 | 2.36 |
| 8 | 86 | Sr | 12 | 1.34 |
| 9 | 86 | Sr | 29 | 1.74 |
| 10 | 86 | K | 27 | 1.10 |
| 11 | 86 | K | 41 | 1.15 |

[1] Fraction of Cs Cation Equivalent Ranges for Selected A values:

| A | Upper Limit | Lower Limit |
|---|---|---|
| 64 | 0.2616 | 0.0616 |
| 86 | 0.5234 | 0.15 |
| 96 | 0.6424 | 0.15 |

What is claimed is:

1. A process for the separation of ethylbenzene from a mixture of $C_8$-aromatics which comprises preferential adsorption of ethylbenzene by contacting the mixture under adsorption conditions with a faujasite in which the number of aluminum atoms per unit cell, A, ranges from 64 to 96, inclusive, and in which faujasite the fraction of equivalents of cesium cations present calculated on total equivalents of cations present in the faujasite is from 0.0119A minus 0.5 to the least of 0.15 or 0.0119A minus 0.7, the remainder of the cations present in the faujasite is selected from the group consisting of strontium, calcium and sodium, followed by desorption of the adsorbed $C_8$-aromatics.

2. The process of claim 1 wherein the mixture of $C_8$-aromatics comprises para-xylene.

3. The process of claim 1 wherein A ranges from 74 to 96, inclusive.

4. The process of claim 1 wherein the remainder of the cations present in the faujasite is calcium.

5. The process of claim 1 wherein the remainder of the cations present in the faujasite is sodium.

6. The process of claim 1 wherein the mixture of $C_8$-aromatics contacted with the faujasite is in the liquid phase.

7. The process of claim 6 wherein the temperature during the contact is from 0°–300°C.

8. The process of claim 7 wherein the pressure during the contact is about 1 bar.

9. The process of claim 2 wherein A ranges from 74 to 96, inclusive, the remainder of the cations present in the faujasite is calcium or sodium, the mixture of $C_8$-aromatics is in the liquid phase, and the adsorption conditions include a temperature from 0°–300°C and a pressure of about 1 bar.

* * * * *